Inventor
FREDERICK GEORGE WILSON
By Young & Thompson
Attorneys

April 29, 1969 F. G. WILSON 3,441,158

VEHICLE WITH FIFTH WHEEL AND LOAD LIFTING AND CARRYING APPARATUS

Filed Sept. 2, 1966 Sheet 2 of 5

Inventor
FREDERICK GEORGE WILSON
By Young & Thompson
Attorneys

Inventor
FREDERICK GEORGE WILSON
By Young + Thompson
Attorneys

Fig. 5
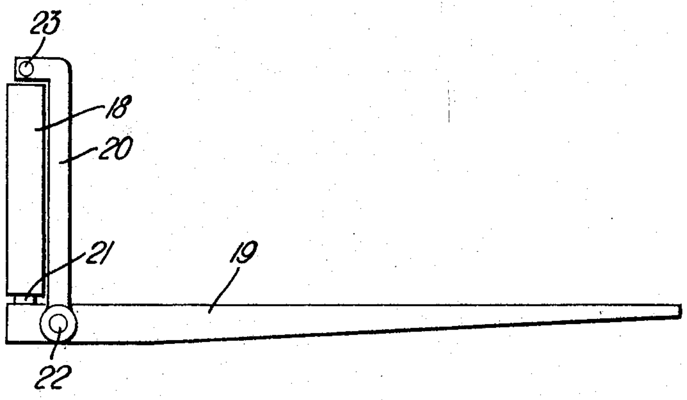
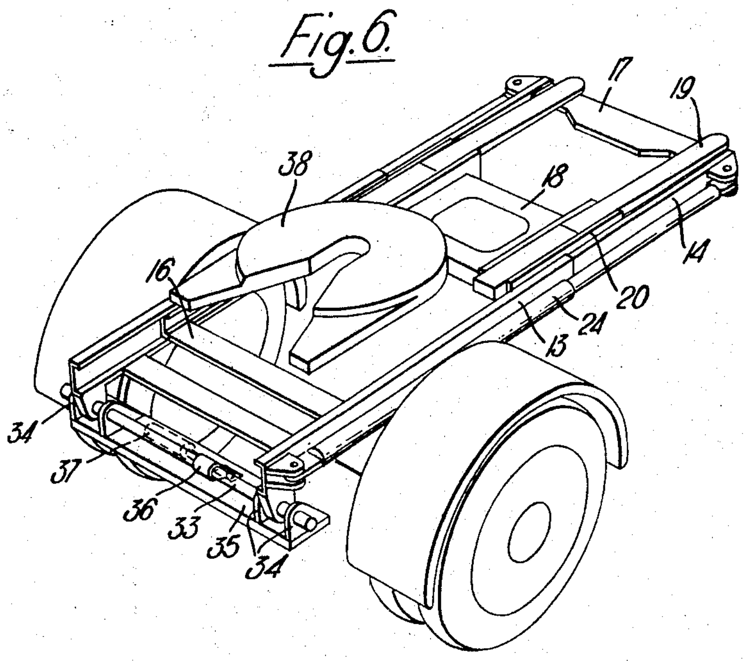
Fig. 6
Inventor
FREDERICK GEORGE WILSON
By Young & Thompson
Attorneys Inventor
FREDERICK GEORGE WILSON
By Young & Thompson
Attorneys

United States Patent Office 3,441,158

Patented Apr. 29, 1969

3,441,158

VEHICLE WITH FIFTH WHEEL AND LOAD LIFTING AND CARRYING APPARATUS

Frederick George Wilson, 49 Hillsborough Old Road, County Antrim, Lisburn, Northern Ireland Filed Sept. 2, 1966, Ser. No. 577,052

Claims priority, application Great Britain, Sept. 2, 1965, 37,477/65; May 26, 1966, 23,525/66

Int. Cl. B66f 9/12, 9/22

U.S. Cl. 214—672 6 Claims

ABSTRACT OF THE DISCLOSURE

A telescopic fork lift apparatus is mounted on the traction unit of an articulated vehicle. In the stowed or out-of-use position, the apparatus is folded down across the chassis of the traction unit and is so designed that it does not foul the fifth wheel. The trailer can then be articulated and the vehicle driven to its destination, where the trailer is uncoupled and the fork lift apparatus erected to load or unload the trailer. In the stowed position, the fork carrier is located at the top of the telescopic masts so that it lies forward of the fifth wheel, while the forks pivotally overlie the carrier.

This invention relates to load lifting and carrying apparatus.

The present invention comprises the combination of the traction unit of a vehicle having a fifth wheel, with a load lifting and carrying apparatus including two spaced parallel telescopic mast assemblies pivotally mounted at the rear end of the traction unit and movable between an out-of-use position in which the mast assemblies overlie the deck of the traction unit on either side and below the level of the fifth wheel and an in-use position in which the mast assemblies are located substantially upright thereon, first power operated means mounted on the traction unit and connected to the mast assemblies to raise and lower same, second power operated means incorporated in the mast assemblies for extending the members of each assembly and a load carrier slidably mounted between the telescopic mast assemblies and movable therealong when the members of each assembly are moved relative to each other.

Preferably, in the stowed position, the members of each mast assembly are partly extended so that when the assemblies are in the working position, the members are retractable thereby to lower the load carrier to or adjacent to ground level.

Preferably also, third power operated means is mounted on the chassis to engage at least one of the mast assemblies in the out-of-use position to assist said first power means in the initial lifting of said mast assemblies and to cushion the fall of said mast assemblies over the final inches.

Preferably also, a side-shift mechanism is provided comprising an axle on which the mast assemblies are mounted for rotational movement but are prevented from sliding movement thereon, brackets carrying said axle and a power operated means to move said axle transversely.

Preferably also, the load carrier is a fork carrier plate and a foldable fork unit is provided comprising at least two fork members and a link member pivotally connected at one end to each fork member, said link member being adapted at its other end for pivotal connection to the fork carrier plate and to lie against said plate, said fork members being pivotal between a working position in which they lie perpendicular to the carrier plate and an out of use position in which they lie parallel to and abut the carrier plate.

Preferably, said link members are of such length that they extend beyond the lower end of the carrier plate and preferably also the pivotal connection of the fork and link members are spaced from the end of the fork members so that in the working position one end of each fork member abuts the lower face of the carrier plate.

Embodiments of the present invention will now be described by way of example, with reference to the accompanying drawings, in which:

FIG. 5 is a side view of the fork assembly;

FIG. 6 is a perspective view of the apparatus in the stowed position on the traction unit.

Figure 1:
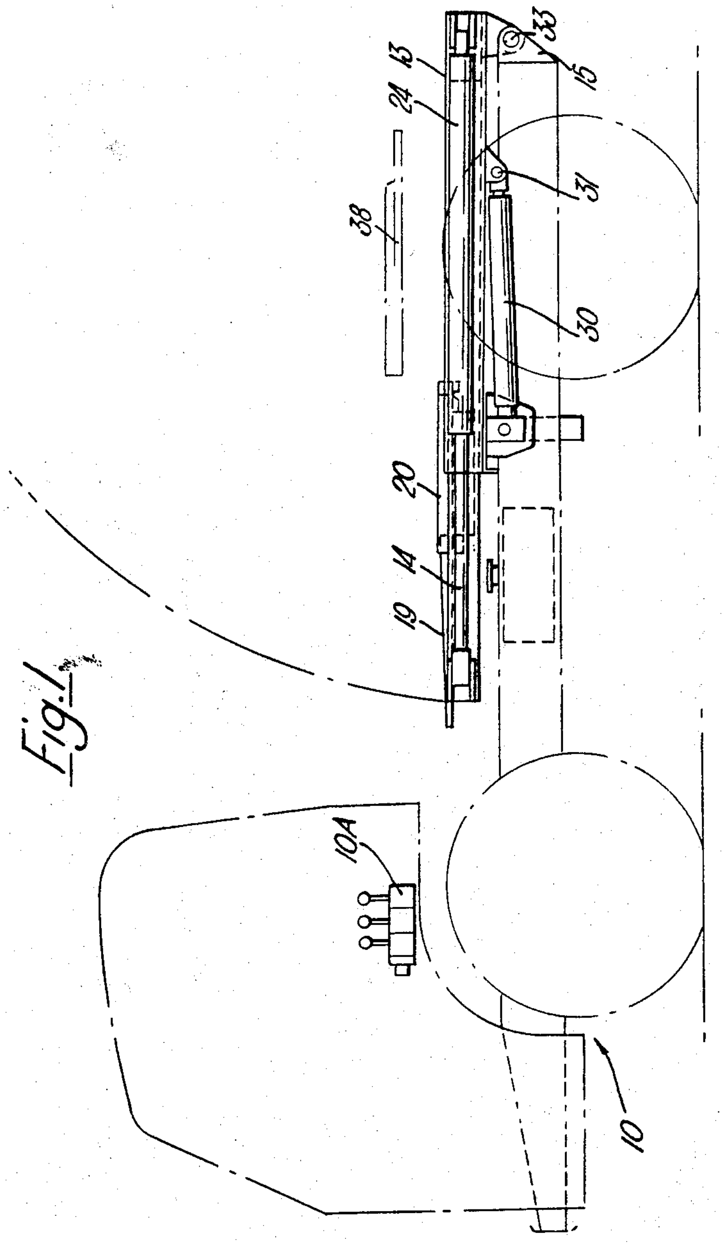
FIG. 1 is a side view of a traction unit mounting apparatus according to the invention in the stowed position.
Figure 2:
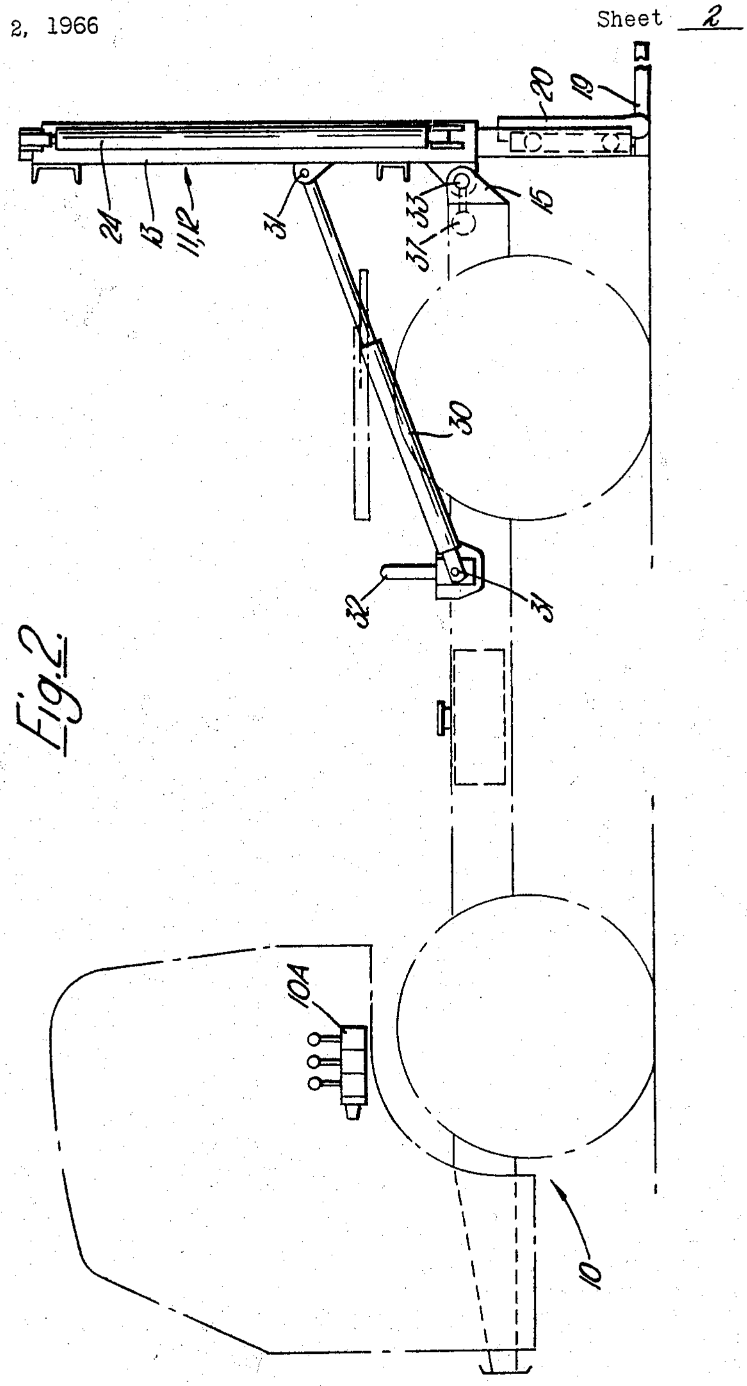
FIGS. 2 and 3 are views showing the apparatus in the working position.

Referring to the drawings, in the first embodiment the apparatus for lifting and carrying loads is in the form of a fork lift unit. It is mounted at the rear end of the traction unit 10 of an articulated lorry and is pivotal between an "out-of-use" or "stowed" position (FIG. 1) in which it overlies the chassis of the traction unt 10 and an "in-use" or "working" position (FIGS. 2 and 3) in which it is substantially upstanding thereon.

In the following description the unit is described with reference to its working position.

Figures 3, 4:
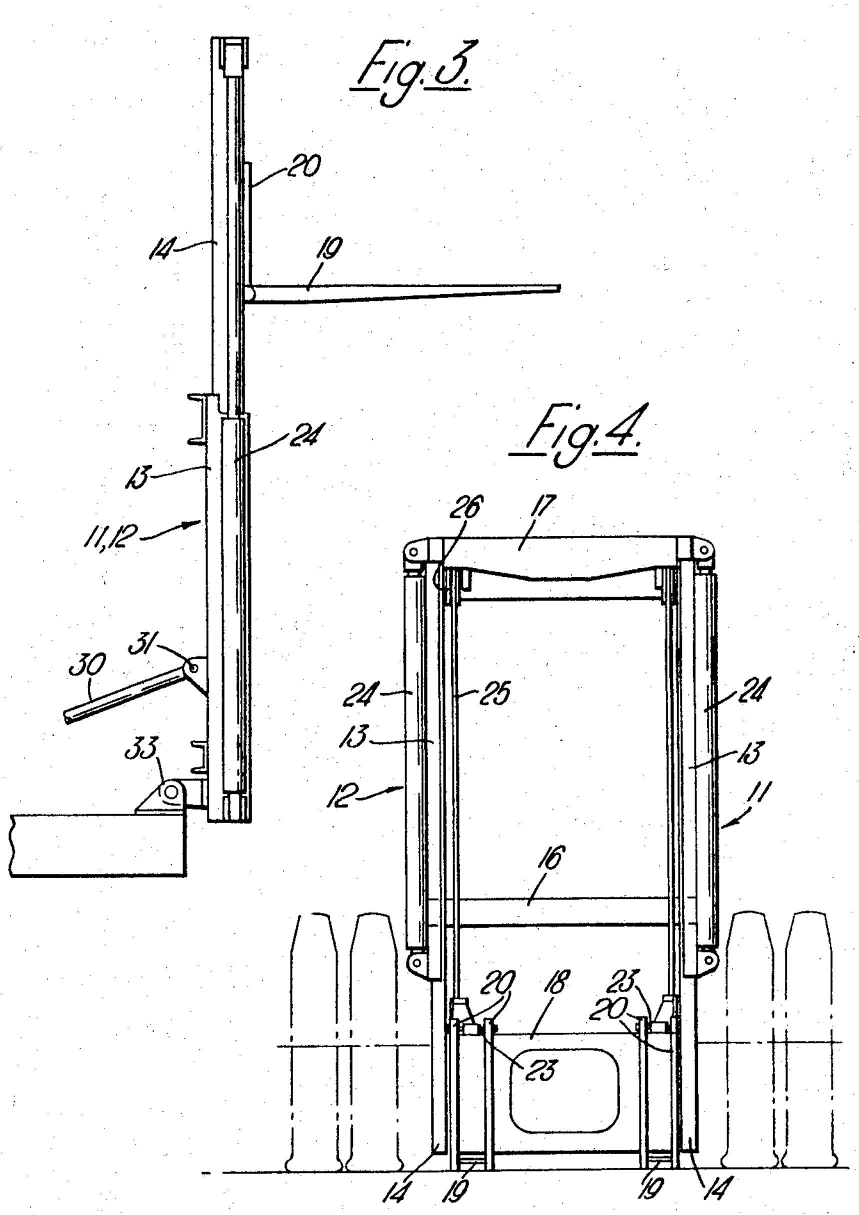
FIG. 4 is a rear view of the apparatus.

The apparatus as shown best in FIG. 4 includes two transversely spaced parallel mast assemblies 11, 12, each of which is telescopic and comprises two channel iron beams 13, 14, located one within the other but spaced apart by anti-friction means (not shown) so that the inner beam 14 is slidable along the other one 13. The outer beam 13 is pivotally mounted to a bracket 15 on the chassis of the traction unit 10. The inner beams 14 of each assembly are connected at both ends by a cross bar 16, 17, and a carrier plate 18 is slidably mounted thereon. The carrier plate mounts two forks 19 in the form of a foldable fork unit shown best in FIGS. 4 and 5.

The foldable fork unit includes two fork members 19 each of which is pivotably connected to one end of a pair of link members 20 and said link members 20 are pivotally mounted at their other ends to the top of the carrier plate 18 and hang therefrom abutting the face thereof. The link members 20 are of such length that they extend below the carrier plate 18 and are connected to the fork members 19 at a short distance from the end of the fork members.

The fork members 19 are pivotal between an out of use position in which they lie parallel to and abut the face of the carrier plate (see FIG. 6) and a working position, in which they lie perpendicular to the carrier plate, i.e. horizontal; in the working position one end of the fork members abut the lower face of the carrier plate via a spacer block 21 which is bolted to the fork members, and which can be replaced when worn.

Each pair of link members each comprise two arms which are enlarged at one end to receive pins 22 which engage and retain a fork member between the arms, and at their other end said arms are turned through 90° (FIG. 5) so that the ends extend over and engage spindles 23 on the upper face of the carrier plate 18.

The link members 20 and fork members 19 are the same width so that in the out of use position (FIG. 6) the forks are concealed within the links.

A single-acting hydraulic ram 24 is mounted on outer face of each stationary beam 13 of the mast assembly and is connected to the corresponding slidable beam 14. When actuated the rams 24 force the slidable beams upwards in an "upper" position (FIG. 3) in which the cross bar 17 is higher than the top of the stationary beams. At the same time (because of an arrangement hereinafter described) the carrier 18 moves towards the top of the slidable beams. The ram is preferably of 1- or 2-stage type giving a greater height to which the carrier may be raised.

In the stowed position, the rams 24 and consequently the members of each mast assembly are partly extended so that when the assemblies are in the working position the rams and consequently the members can be retracted thereby to lower the load carrier 18 to or adjacent to ground level. This ensures that the fork can engage loads below the level of the vehicle chassis.

In the "lower" position of the slidable beams 13 (FIG. 2) the carrier 18 is at the lower end of the slidable beam and said beams extend downwardly beyond the lower end of the stationary beams 13.

The arrangement hereinbefore mentioned comprises a chain or wire 25 is connected at each end of the carrier plate and extend upwards over pulleys 26 on the cross bar 17 and are connected to the stationary beams 13 at a location just below the level of the cross bar in its lower position. Thus, when the slidable beams are moved upwards relative to the stationary beams the carrier plate is drawn up by the chains and moves at a speed, for example, twice that of the slidable beams.

A double-acting hydraulic ram 30 (FIGS. 2, 3) is mounted on each side of the chassis of the traction unit 10 and is connected to the adjacent stationary beam 13 and serves to raise and lower the masts between their in-use and out-of-use positions. The rams also serve to retain the masts in the in-use position. Each ram 30 is connected to the chassis 10 and beam 13 by swivel joints 31.

The double acting rams are so angled, that when the masts are in or near their lower position, the rams become ineffective and at least one vertical ram 32 is therefore provided to assist the double acting rams 30 during the initial lift of the masts and to cushion the fall of the masts to the lower position, over the last few inches.

The vertical ram 32 is located on the chassis of the traction unit in a position where it can engage one of the masts and is of length sufficient to raise the masts to an angle at which the double acting rams become effective.

The single-acting, double-acting, and vertical rams are actuated by an hydraulic system (not shown) including a pump which is coupled to the power take-off shaft of the traction unit gear box (or alternatively to the vehicle's engine) and operation of the rams is controlled from control levers 10A within the cab of the traction unit 10.

A side shift mechanism (FIG. 6) is provided whereby the mast assemblies may be moved transversely, say 3 inches each way, in order to assist the operator in approaching the load to be lifted.

The lower ends of the stationary beams 13 are mounted on an axle 33 which is carried by two pairs of brackets 34 which are mounted on a support plate 35. The brackets have bronze bushes (not shown) to provide easy sliding movement of the axle carried therein. The beams are rotatable on the axle but are prevented from lateral movement relative thereto so that when the axle is moved transversely the mast assemblies move therewith. A bar 36 is mounted on the axle and extends therefrom through a slot in the plate 35 and a double-acting ram 37 is connected to the bar to move said bar transversely. Said ram 36 is operated in conjunction with the other rams 30, 32.

Figure 7:
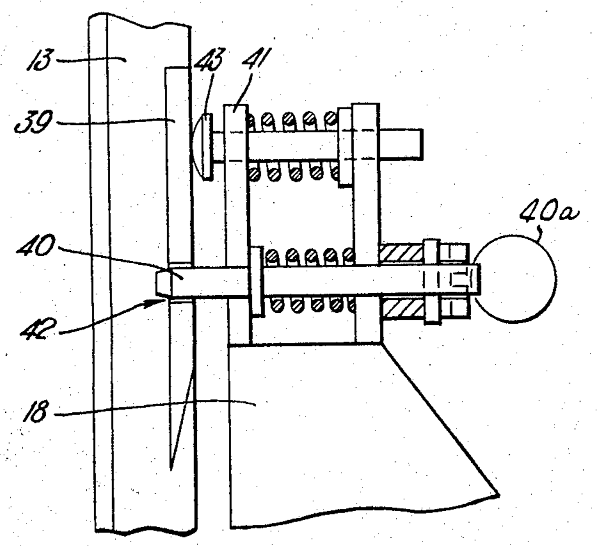
FIG. 7 is a sectional detail showing the locking device.

In use, the apparatus is used to load the trailer of the articulated lorry. The masts are firstly raised to their working position and as they reach the vertical, the fork members swing about their link connections 22 into the horizontal position. The carrier plate 18 is then lowered to its lower position which brings the plate close to the ground. The vehicle is backed towards the load to be lifted and when the forks have engaged under the load, the masts are pivoted forward a short distance in order to securely cradle the load and also to shift the centre of gravity of the load close to the rear axle of the vehicle. The vehicle then carries the load to the trailer which it approaches in reverse. The load is raised by elevating the carrier plate and finally set down on the trailer. This operation is repeated as often as necessary, but before the masts are lowered it may be necessary to move the carrier plate to its upper position. This is to telescope the slidable beams so that they will not extend beyond the rear of the traction unit and also when the assemblies are lowered to the stowed position, it is necessary to ensure that the carrier does not foul fitment on the rear of the chassis, in particular, the fifth wheel plate 38. To prevent this from happening, the carrier 18 is raised to or adjacent to its upper position. However, this may result in the cross bar 17 of the slidable beams 14 fouling the cab when the assemblies are pivoted to the stowed position; but lowering the cross bar 17 say, 3 inches, results in a lowering of the carrier 18 by 6 inches and may result in fouling the fifth wheel plate. A locking device is therefore provided so that the slidable beams 14 and the carrier 18 move together at the same rate. This locking device, as shown in FIG. 7, is mounted on the assembly, preferably at the driver's side of the vehicle and comprises a keeper 39 at the top of the beam 14 and a spring loaded pin 40 mounted on a bracket 41 at the top of the carrier 18. The pin 40 is normally retained in the withdrawn, out of use position. When the pin is in the extended position and engages the plate 39, it becomes located in an aperture 42 in the plate and remains therein until withdrawn manually, via a ring 40*a*. With the beams 14 and carrier 18 locked together, the beams 14 may be lowered the required distance and the assemblies then pivoted to the stowed position. In the stowed position, the pin withdrawn so that when the assemblies are raised to the working position, the carrier will again move at twice the rate of the beams 14. However, friction discs 43 are mounted on the bracket 41 to prevent instant movement between the carrier 18 and beams 14 when the assembly begins to pivot upwards. The friction discs prevent movement only for a time sufficient to raise the carrier above the level of the fifth wheel plate 38. As the masts are lowered, the fork members swing to overlie the carrier plate and as the masts approach their lower position, the vertical ram is engaged and supports the fall over the final few inches.

The traction unit is then coupled to the trailer and the load driven to its destination where the trailer is uncoupled, the apparatus raised to the working position. The plate is then lowered to the required height and unloading commenced.

In a second embodiment not shown, the fork arms are replaced by a crane jib but otherwise the apparatus is as hereinbefore described. The jib is preferably pivotally adjustable on the carrier plate so that the height of the free end can be raised to a level higher than the top of the masts.

The apparatus is otherwise as hereinbefore described with reference to the first embodiment.

A mirror may be mounted on the mast by a movable bracket which is adjustable so that the driver can see the points of the forks and the load to be lifted to ensure correct entry of the forks to the load.

When loading materials such as bricks the forks are replaced by special clamps. These clamps are attached to the carrier plate by snap action couplers and hydraulic connections. When the final load has been placed on the trailer the clamps are uncoupled from the carrier plate and remain on the trailer; to re-engage the clamps the vehicle is reversed at a proper height. After unloading the clamps are placed on the trailer and disconnected from the carrier plate until further required.

In a modification, the fork carrier includes side extension pieces whereby the forks are movable laterally beyond the mast assemblies.

The controls 10A may be duplicated on the chassis of the traction unit 10, preferably at the rear thereof.

I claim:

1. In combination with a traction unit of a vehicle having a fifth wheel, a load-lifting and -carrying apparatus including two spaced parallel telescopic mast assemblies pivotally mounted at the rear end of the traction unit and movable between an out-of-use position in which the mast assemblies overlie the deck of the traction unit on either side and below the level of said fifth wheel and an in-use position in which the mast assemblies are located substantially upright thereon, first power-operated means mounted on the traction unit and connected to the mast assemblies, to raise and lower same, second power-operated means incorporated in the mast assemblies for extending the members of each assembly, and a load carrier slidably mounted between the telescopic mast assemblies and movable therealong when the members of each assembly are moved relative to each other, said load carrier being located at the top of the mast assemblies when the apparatus is in the out-of-use position so as to lie forward of the fifth wheel.

2. Apparatus as claimed in claim 1, wherein the load carrier is a fork carrier plate and a foldable fork unit is provided comprising at least two fork members and a link member pivotally connected at one end to each fork member, said link member being adapted at its other end for pivotal connection to the fork carrier plate and to lie against said plate, said fork members being pivotal between a working position in which they lie perpendicular to the carrier plate and an out-of-use position in which they lie parallel to and abut the carrier plate, said link members being of such length that they extend beyond the lower end of the carrier plate.

3. Apparatus as claimed in claim 2, the pivotal connection of the fork and link members being spaced from the end of the fork members so that in the working position one end of each fork member abuts the lower face of the carrier plate.

4. Apparatus as claimed in claim 1, wherein a side-shift mechanism is provided comprising an axle on which the mast assemblies are mounted for rotational movement but are prevented from sliding movement thereon, brackets carrying said axle, further power-operated means to move said axle transversely, and means swivelably mounting said first power-operated means on said traction unit to permit transverse movement of the mast assemblies.

5. Apparatus as claimed in claim 1, wherein in the stowed position, the members of each mast assembly are partly extended so that when the assemblies are in the working position, the members are retractable thereby to lower the load carrier to or adjacent to ground level.

6. Apparatus as claimed in claim 1, wherein third power-operated means is mounted on the traction unit to engage at least one of the mast assemblies in the out-of-use position to assist said first power means in the initial lifting of said mast assemblies and to cushion the last portion of the fall of said mast assemblies.

References Cited

UNITED STATES PATENTS

| | | | |
|---|---|---|---|
| 2,867,341 | 1/1959 | Tieslau | 214—672 |
| 2,910,203 | 10/1959 | Todd | 214—672 |
| 2,980,269 | 4/1961 | Zimmerman | 214—671 X |
| 3,033,400 | 5/1962 | Smith | 214—672 |
| 3,220,698 | 11/1965 | Carder | 214—512 X |
| 3,272,287 | 9/1966 | Easton. | |

GERALD M. FORLENZA, *Primary Examiner.*

FRANK E. WERNER, *Assistant Examiner.*